United States Patent [19]

Moteki

[11] Patent Number: 4,875,114
[45] Date of Patent: Oct. 17, 1989

[54] SYSTEM FOR DETECTING A REFERENCE TRACK ON A DISK SURFACE IN A DISC STORAGE UNIT

[75] Inventor: Eiji Moteki, Kawasaki, Japan

[73] Assignee: Fuji Electric Company Ltd., Kawasaki, Japan

[21] Appl. No.: 106,882

[22] Filed: Oct. 9, 1987

[30] Foreign Application Priority Data

Dec. 3, 1986 [JP] Japan ................................ 61-288008

[51] Int. Cl.⁴ .............................................. G11B 5/596
[52] U.S. Cl. .................................. 360/77.08; 360/78.14
[58] Field of Search ..................... 360/75, 77.07, 77.08, 360/78.04, 78.13, 78.14

[56] References Cited

U.S. PATENT DOCUMENTS

| | | | |
|---|---|---|---|
| 4,048,660 | 9/1977 | Dennison et al. | 360/77.08 |
| 4,086,636 | 4/1978 | Cizmic et al. | 360/78.07 |
| 4,419,701 | 12/1983 | Harrison et al. | 360/78.11 |
| 4,516,177 | 5/1985 | Moon et al. | 360/77.07 |
| 4,683,504 | 7/1987 | Cantello et al. | 360/78.14 |

Primary Examiner—Aristotelis M. Psitos
Assistant Examiner—David L. Robertson
Attorney, Agent, or Firm—Spencer & Frank

[57] ABSTRACT

In a system for detecting a reference track on a disc for a disc storage unit, servo information for detecting an off-track amount of a position of a read/write head relative to the track is written on the disc surface. The servo information is formed by a repetition of simple patterns. A pattern of servo information for a reference track among those patterns is written at a frequency different from that for ordinary tracks. The write-in frequencies of the patterns for ordinary and reference tracks are discriminated from each other in accordance with the signals obtained by reading out the servo information written onto the tracks from the read/write head. When the write-in frequency for a reference track is discriminated, it is detected that the head is on the reference track. A reference track can be detected without having recourse to a particular sensor and a circuit attached thereto.

15 Claims, 4 Drawing Sheets

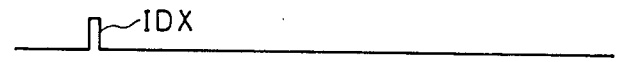
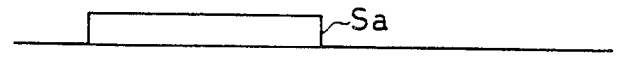
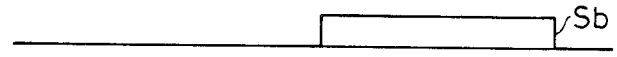
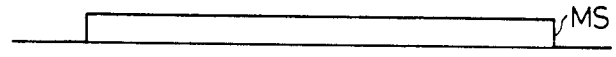
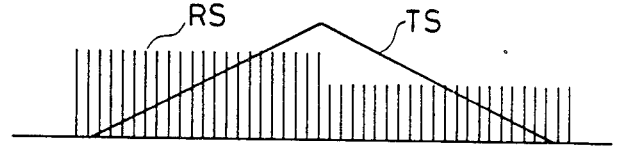
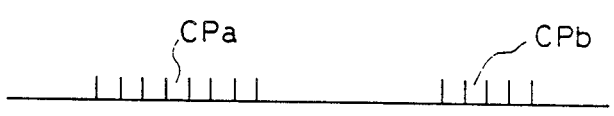
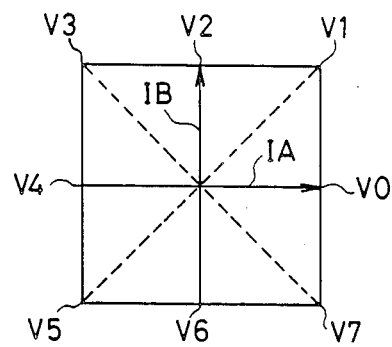
FIG. 6

SYSTEM FOR DETECTING A REFERENCE TRACK ON A DISK SURFACE IN A DISC STORAGE UNIT

BACKGROUND OF THE INVENTION

1. Field of the Invention

The present invention relates to a system for detecting a position of a reference track, for example, the outermost track on a disc for a disc storage unit in which plural tracks are provided on the disc surface like in the case of a fixed disc storage unit, and in which servo information for detecting an off-track amount of a position of a read/write head relative to the track is written on the disc surface.

2. Description of the Prior Art

In a disc storage unit, the above-mentioned outermost track is usually referred to as a reference track of track number 0, and the serial numbers 1, 2, --- are assigned as track numbers to all other tracks on the disc in the inward sequence of tracks from the outermost track. When the head is moved to a desired track, the number of this track is designated, or alternatively, the difference between the present track number and the desired track number is designated. In case the stored number of a track where the head is currently located has been lost for some reason or other, the head is returned to the position of the reference track to confirm the position of the reference track, so that the number of the track where the head is located is stored correctly again.

When operation of the disc storage unit is stopped, if the head remains located on a track, the head may damage the storage medium on the disc surface when unexpected vibration or shock is applied to the head. When, therefore, the operation is stopped, it is usual that the head is rested in a so-called shipping zone formed on the inner diameter side of the disc separately from the tracks. When the operation of the disc storage unit is resumed, the head is moved from this shipping zone to a track. At this time, if the position of the innermost track on the disc surface can be detected, then this innermost track may be used as a second reference track, in addition to the above-mentioned outermost track, to determine the number of the track where the head is currently located with reference to the second reference track.

In this manner, it is necessary to detect a specific track defined by some standard on the disc surface, that is, a reference track in the present invention, in order to position the head. The reference track, however, does not have particular characteristics different from an ordinary track other than its name, and accordingly it is not possible hitherto to detect this track by discriminating its own characteristics. So far, the position of the reference track is detected by a position detector provided on a head drive system, for instance, a head carriage, a head arm, or a head drive motor. The detector functions like a limit switch, and can be made of a sensor utilizing the interruption of light between a light emitting diode and a phototransistor like a publicly known photo-interrupter, or of a position sensor represented by a Hall element.

Any of these publicly known detection means needs some sensor such as mentioned above, and accordingly it is also necessary to provide a power feed circuit to the sensor or a processing circuit for processing a sensor output. Also, in order to fit a recent demand of a small diameter disc of, for example, about 3.5 inches, with an increased storage capacity, at least hundreds of tracks are formed on the disc surface at a pitch of less than 10 $\mu$m. In this case, it is necessary to mount the sensor with an accuracy of 10 $\mu$m or less. Therefore, sensor mounting and position adjustment of the mounted sensor are so troublesome that mass production of disc storage units will have to be time-consuming. Moreover, it is usually difficult to obtain accurately a detection output from a sensor with respect to only one reference track, and the sensor output is likely to be obtained from the reference track and several tracks adjacent to the reference track. Consequently, it is also necessary to provide means for picking one particular reference track out of those several tracks. As a result, an arrangement of means for processing a sensor output will become complicated.

SUMMARY OF THE INVENTION

With the above in view, it is an object of the present invention to provide a system for detecting a reference track on a disc for a disc storage unit in which it is not particularly required to provide a sensor for detecting a reference track and therefore the troublesome work of sensor mounting and position adjustment of the mounted sensor are omitted.

In order to achieve this object, the present invention provides a system for detecting a reference track on a disc for a disc storage unit, in which servo information for detecting an off-track amount of a position of a read/write head relative to the track is written on the disc surface. The servo information is formed, for example, by a repetition of simple patterns. A pattern of servo information for a reference track among those patterns is written at a frequency different from that for ordinary tracks. The write-in frequencies of the patterns for ordinary and reference tracks are discriminated from each other in accordance with the signals obtained by reading out the servo information written on the tracks from the read/write head. When the write-in frequency for a reference track is discriminated, it is detected that the head is on the reference track.

More specifically, the present invention provides a system for detecting a reference track on a disc surface in a disc storage unit wherein the disc surface has a plurality of tracks and wherein servo information for detecting an off-track amount of a position of a read/write head relative to the tracks is written on the disc surface, the system;
- the servo information having first servo information for identifying the reference track of the tracks including second servo information associated with the remaining tracks other than the reference track;
- means for reading out the servo information by the read/write head;
- means for judging whether the servo information read out is the first servo information or the second servo information; and
- means for detecting that the read/write head is on the reference track when the means for judging judged that the first servo information was read.

Here, each of the first servo information and the second servo information may consist of a repeated pattern of different frequencies.

The frequency for the first servo information may be k times (k>1) higher than that for the second servo information.

The means for judging may discriminate the frequency for the first servo information from the frequency for the second servo information.

Further, the servo information may be written in such a way that the servo information interrupts a part of the track, and that the center of an area onto which the servo information is written is deviated by about one half a pitch between the tracks relative to the center of the track, and each servo information may be written onto the area in such a way that the area is alternately deviated in the direction of the track between two adjacent tracks.

The first servo information for the reference track may be arranged on at least one side of the reference track.

The reference track may be the outermost track of the disc and/or outermost and innermost tracks of the disc.

The first servo information may be arranged separately in a part of the second servo information.

Another aspect of the present invention provides a disc storage unit having a disc, on a disc surface of which a plurality of tracks are arranged and first information for identifying a reference track of the tracks and second information for detecting an off-track amount of a position of a read/write head relative to the tracks are arranged, and the disc storage unit includes;

means for reading out the first information and the second information from the read/write head;

means for discriminating the first information and the second information from an output read out by the means for reading out; and means for detecting that the read/write head is positioned at the reference track when the means for discriminating discriminates that the output contained the first information.

A further aspect of the present invention provides a method for detecting a reference track on a disc surface of a disc having a plurality of tracks on the disc surface, containing servo information for detecting an off-track amount of a position of a read/write head relative to the tracks, and the method comprises the steps of:

writing the servo information on the reference track of the tracks in such a way that the servo information functions as the servo information with respect to the remaining tracks and as discriminating information for discriminating the reference track;

reading out the servo information by the read/write head; and judging the discriminating information from the servo information read out.

Here, each of the first servo information and the second servo information may consist of a repeated pattern of different frequencies.

The frequency for the first servo information may be k times (k>1) higher than that for the second servo information.

The servo information may be written in such a way that the servo information interrupts a part of the track, and that the center of an area onto which the servo information is written is deviated by about one half a pitch between the tracks relative to the center of the track, and each servo information may be written onto the area in such a way that the area is alternately deviated in the direction of the track between two adjacent tracks.

The first servo information for the reference track may be arranged on at least one side of the reference track.

The reference track may be the outermost track of the disc and/or outermost and innermost tracks of the disc.

The first servo information may be arranged separately in a part of the second servo information.

An example of the above-mentioned simple pattern to be written on the disc as servo information can be mere on-off patterns, that is to say, mere repetitive patterns of N and S poles, in the case of magnetic recording. This repetitive pattern is most desirable in case of reference track detection. Even if the servo information is given in the form of such a simple pattern, an off-track amount of the head relative to the track can be determined accurately enough as will be apparent from an embodiment to be described later.

Concerning a write-in frequency for this simple pattern, it is sufficient in principle that the frequency for reference track servo information is made different from that for ordinary track servo information. For practical purposes, it is preferable that the former frequency is selected to be an integer multiple least 2 times higher than the latter frequency. The write-in frequency can, of course, be discriminated by directly detecting or discriminating a natural frequency of a signal obtained by reading out various servo information by the head by means of a filter or the like. In order to detect the off-track amount, it is basically necessary to count the number of the repetition of simple patterns. Thus, it becomes much simpler and practically advantageous to utilize the count result per se and to discriminate the write-in frequency by means of software.

Further, if servo information is written in a reference track at a write-in frequency different from that for an ordinary track as mentioned above, then theoretically the signal obtained by reading out the servo information or the above-described count result per se cannot be used to detect an off-track amount. Nevertheless, it is possible to use the count result to detect an off-track amount, if the count result is corrected or modified in a very simple way. It is also desirable, from the viewpoint of judging the need for such correction and simplifying the correction, to select the simple pattern write-in frequency for a reference track to be integer (2 or more) times higher than that for an ordinary track as mentioned above. When this integer multiple becomes too high, however, the high frequency characteristics of the circuit for reading servo information cannot fully follow the high frequency. Thus, in practice, it is preferable to select two or three as the integer multiplier two is sufficient for practical applications and most advantageous as well.

Also, the aforementioned writing of a simple pattern at different frequencies need not necessarily be limited to one reference track. For example, when a stepping motor is employed for the head drive as is common, a relationship of correspondence exists between a head position and a vector position on an internal electrical angle of the stepping motor. Hence, even if a plurality of tracks near the reference track have simple patterns as servo information with a different write-in frequency, the relationship of correspondence can be utilized to identify one reference track easily among the plurality of tracks from which the different write-in frequency has been discriminated. In principle, detection of a reference track is fully possible, of course, even without writing servo information at the different frequency into a plurality of tracks near the reference track. Yet, in order to ensure the detection of the reference track, it is preferable that the plural tracks are used for detecting the reference track.

As apparent from the above, in the present invention, by merely writing a simple pattern of servo information into a reference track at a write-in frequency different from that for ordinary tracks, the track of that different write-in frequency, namely, the reference track, can be detected by means of discrimination from the read out signal of the servo information read out by the head. According to the present invention, therefore, a reference track can be detected without having recourse to a particular sensor and a circuit attached thereto as used hitherto. In other words, in the present invention, by effectively utilizing, in lieu of a sensor, the servo information and the head basically provided in a disc storage unit, the above-mentioned object is accomplished merely by slightly modifying the write-in form of servo information for a reference track and providing simple means for discrimination.

The above and other objects, effects, features and advantages of the present invention will become more apparent from the following description of preferred embodiments thereof taken in conjunction with the accompanying drawings.

BRIEF DESCRIPTION OF THE DRAWINGS

FIGS. 4A-4H illustrate examples of various waveforms for major signals in the off-track detection circuit;

FIG. 6 is a vector diagram showing current vectors in a stepping motor employed in a head drive.

DETAILED DESCRIPTION OF PREFERRED EMBODIMENTS

Figure 1:
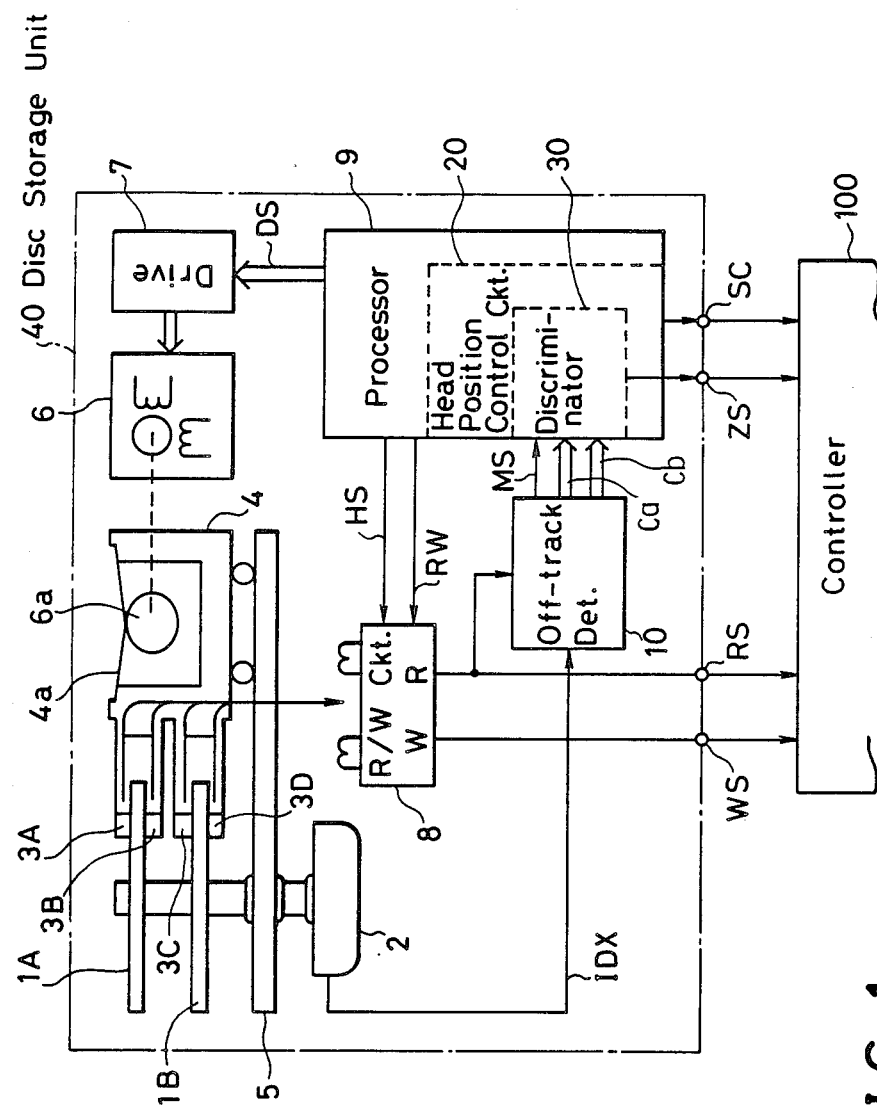
FIG. 1 is a block diagram showing a major portion of an embodiment of a disc storage unit to which a system for detecting a reference track according to the present invention is applied.
Figure 2:
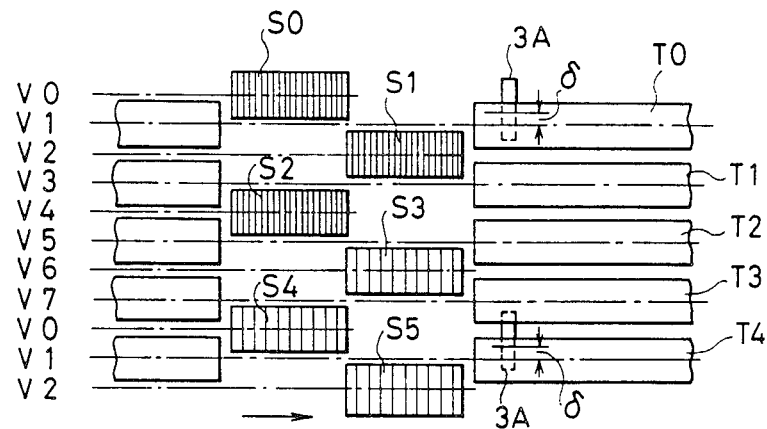
FIG. 2 is a partial schematic view of a disc surface showing an example of track setting and servo information writing in an embodiment of the present invention.

FIG. 1 shows an embodiment of a disc storage unit 40 in which a system of the present invention is employed. FIG. 2 shows examples of tracks T1-T4, including a reference track T0, on one disc surface, and servo information S0 and S1-S5 corresponding thereto.

In FIG. 1, a disc storage unit 40 surrounded by a dash-and-dotted line is a hard disc storage unit. The disc storage unit 40 is provided with, for example, two discs 1A and 1B being rotated at a constant speed by a spindle motor 2. Four read/write heads 3A-3D for reading/writing information from/onto the discs 1A and 1B are provided, corresponding to each disc surface of the two discs 1A and 1B. The heads 3A-3D are supported on a base 5 by a carriage 4 guided movably rightward and leftward in FIG. 1. This carriage 4 is coupled mechanically tightly to a capstan 6a via a thin metal band 4a. The capstan 6a is connected directly to a two-phase stepping motor 6. The carriage 4 moves the heads 3A-3D to a desired position of the discs 1A and 1B in the radial direction, according to the forward or reverse rotation of the stepping motor 6. The stepping motor 6 is driven by a drive circuit 7 receiving a drive signal DS.

The heads 3A-3D are connected to a read/write circuit 8. This read/write circuit 8 receives a head select command HS and a read/write command RW from a processor 9 (for example, an eight-bit microcomputer 8051 manufactured by Intel) incorporated into the disc storage unit 40, so that the head designated by the head select command HS is rendered to read or write mode in accordance with the designation by the read/write command RW. Further, when the reference track T0 is detected in accordance with the present invention, it is assumed that the read/write circuit 8 is in the read mode. In the read mode, a read-out signal RS is derived from the read-out output terminal R of the read/write circuit 8. This read-out signal RS is supplied to a controller 100 or the like attached to the disc storage unit 40 as well as to an off-track detection circuit 10.

Figure 3:
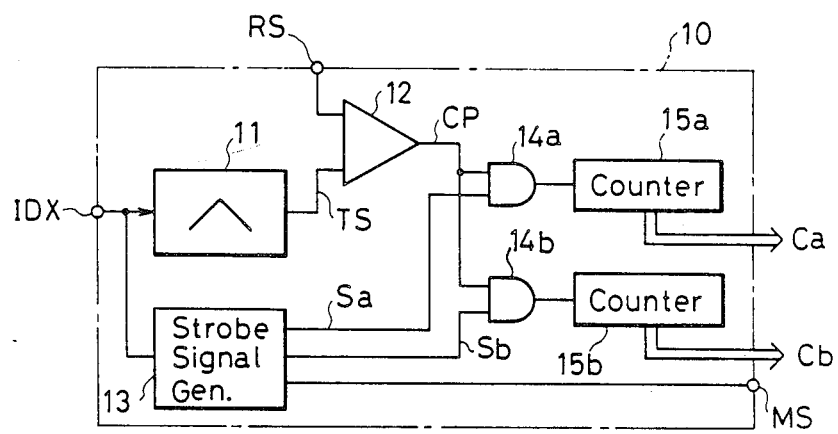
FIG. 3 is a block diagram showing an embodiment of a detailed arrangement for an off-track detection circuit.

This off-track detection circuit 10, which may be arranged as shown in FIG. 3 that will be described later, receives, in addition to the read-out signal RS, an index pulse IDX obtained from the spindle motor 2, normally once per rotation of the discs 1A and 1B to detect an off-track amount or to count a count value, based upon which the off-track amount is computed. The off-track detection circuit 10 supplies counting outputs Ca and Cb and a mask output MS to a head position control circuit 20 which may be contained, for example, in the processor 9 in the form of software. Reference numeral 30 denotes a discrimination circuit which discriminates the write-in frequency for servo information patterns. The discrimination circuit 30 can be incorporated in the head position control circuit 20, and can be implemented by means of software. This discrimination circuit 30 detects the reference track T0 from the output of the off-track detection circuit 10 to produce a reference track signal ZS. The head position control circuit 20 produces the drive signal DS so that the head position is corrected according to the off-track amount thus detected. The correction is carried out by supplying the drive signal DS to the drive circuit 7 to position the heads 3A-3D at a correct position. When this correction is completed, a so-called seek completion signal SC is issued from the head position control circuit 20.

FIG. 2 shows tracks T0 through T4 having corresponding track numbers 0 through 4, of which the track T0 is, for example, the outermost track of a disc, and the track T0 forms a reference track in the present invention. Servo information S0 through S5 in the example shown in FIG. 2 is so written in an area as to interrupt a part of a track in the circumferential direction (the rightward and leftward directions of each track in FIG. 2) of the disc. The center line of the area indicated by a dash-and-dotted line is deviated from the center line of the track by one half of the track pitch in the radial direction between two tracks, and the areas for servo information S0 through S5 are displaced alternately in the direction that the track extends. Consequently, for example, the two areas for servo information S0 and S1 are used to detect an off-track amount of the heads with respect to the reference track T0. The two areas for servo information S1 and S2 are used for the subsequent track T1. In this manner, two subsequent areas are assigned to each of subsequent tracks.

The servo information may be written prior to shipment of the disc storage unit. Alternatively, the servo information may be written by a user onto the discs 1A and 1B loaded to the disc storage unit 40, by controlling the disc storage unit 40 shown in FIG. 1 by the controller 100.

The servo information can be written in the form of a simple on-off pattern as schematically illustrated by vertical lines in FIG. 2. In the example illustrated, the three areas for the servo information S0–S2 near the reference track are written at a frequency k times, or preferably at two times, higher than the write-in frequency for other servo information S3–S5. In this example, therefore, it follows that the servo information S0, S1 and S2, each having the high write-in frequency is used for the two tracks T0 and T1 including the rference track T0, the servo information S2 and S3 having the high write-in frequency and the lower write-in frequency, respectively, is used for the track T2 and the servo information S3, S4, S5, --- having the low write-in frequency is used for all the subsequent tracks. Further, vectors V0 through V7, shown on the left side in FIG. 2, correspond to eight current vector positions of the stepping motor 6, as shown in FIG. 6.

FIG. 3 shows a detailed embodiment of the off-track detection circuit 10 mentioned before. FIGS. 4A–4H illustrate waveforms of various signals in this circuit. A triangular wave generator 11, shown on the left side in FIG. 3, receives the index pulse IDX, to generate a triangular wave signal TS in synchronism with this index pulse IDX. As shown in FIGS. 4E and 4G, the triangular wave signal TS rises and falls linearly within a period of time corresponding to the width of the area onto which the servo information is written, as shown in FIG. 2. The triangular wave generator 11 per se is well known and may easily be composed of a charge-discharge circuit of a capacitor to be triggered with respect to the index pulse IDX. A comparator 12 compares the triangular wave signal TS with the read out signal RS in a manner shown in FIGS. 4E and 4G. As a result, a comparison output CP is obtained in the form of count pulses including many positive and negative waves such as shown in FIGS. 4F and 4H. It is to be noted that in FIGS. 4E and 4F only the positive portions of those waves are shown simply by vertical lines.

When the center line of the head 3A, for example, has an off-track amount of 6 from the track center line as shown in FIG. 2, the waveforms in the read out signal RS obtained from the two areas of the servo information S0 and S1, for example, corresponding to the reference track T0 have different wave heights corresponding to the two areas of the servo information as shown in FIG. 4E, so the count pulses derived from the comparator 12 have different numbers of pulses for the two areas of the servo information, as distinguished by CPa and CPb in FIG. 4F. Thus, the difference in pulse number between both the count pulse groups CPa and CPb indicates a value representing the off-track amount.

This is also true, for example, in case of FIGS. 4G and 4H showing the servo information for the track T4. In this case, the write-in frequency of the simple pulse corresponding to the servo information S4 and S5 is lower than in the case of FIGS. 4E and 4F. Hence, the number of pulses in the count pulse groups CPa and CPb outputted from the comparator 12 is decreased, as shown in FIG. 4H.

Two counters 15a and 15b, shown on the right side in FIG. 3, count the above-mentioned count pulse groups CPa and CPb, respectively, to generate count outputs Ca and Cb, respectively. To have these counters 15a and 15b count both the count pulse groups separately, a strobe signal generator 13 and two AND gates 14a and 14b are provided in the off-track detection circuit 10. The strobe signal generator 13 receives the index pulse IDX shown in FIG. 4A, so that in synchronism with the index pulse IDX, the generator 13 generates two strobe signals Sa and Sb produced at different timings as shown in FIGS. 4B and 4C. The time periods of the strobe signals Sa and Sb correspond to the rise and fall periods of the above-mentioned triangular wave signal TS, respectively. These strobe signals Sa and Sb and the count pulse CP are supplied to the input terminals of the AND gates 14a and 14b, respectively. As a result, the AND gates 14a and 14b are enabled only during the period of time that the strobe signals Sa and Sb are produced, respectively, so that the counters 15a and 15b count separately the respective numbers of count pulses contained in the count groups CPa and CPb. The strobe signal generator 13 in this embodiment generates, in addition to the strobe signals Sa and Sb, a so-called mask signal MS, as shown in FIG. 4D, during the entire read-out period of the servo information, that is, during the total period of the periods of the strobe signals Sa and Sb. This mask signal MS and the count values Ca and Cb from the counters 15a and 15b are outputted from the off-track detection circuit 10, and are supplied to the discriminator 30 in the head position control circuit 20, as mentioned previously. Further, the aforementioned strobe signal generator 13 may be arranged, as easily understood, by properly combining, for example, flip-flop circuits with counters in a publicly known fashion.

Figure 5:
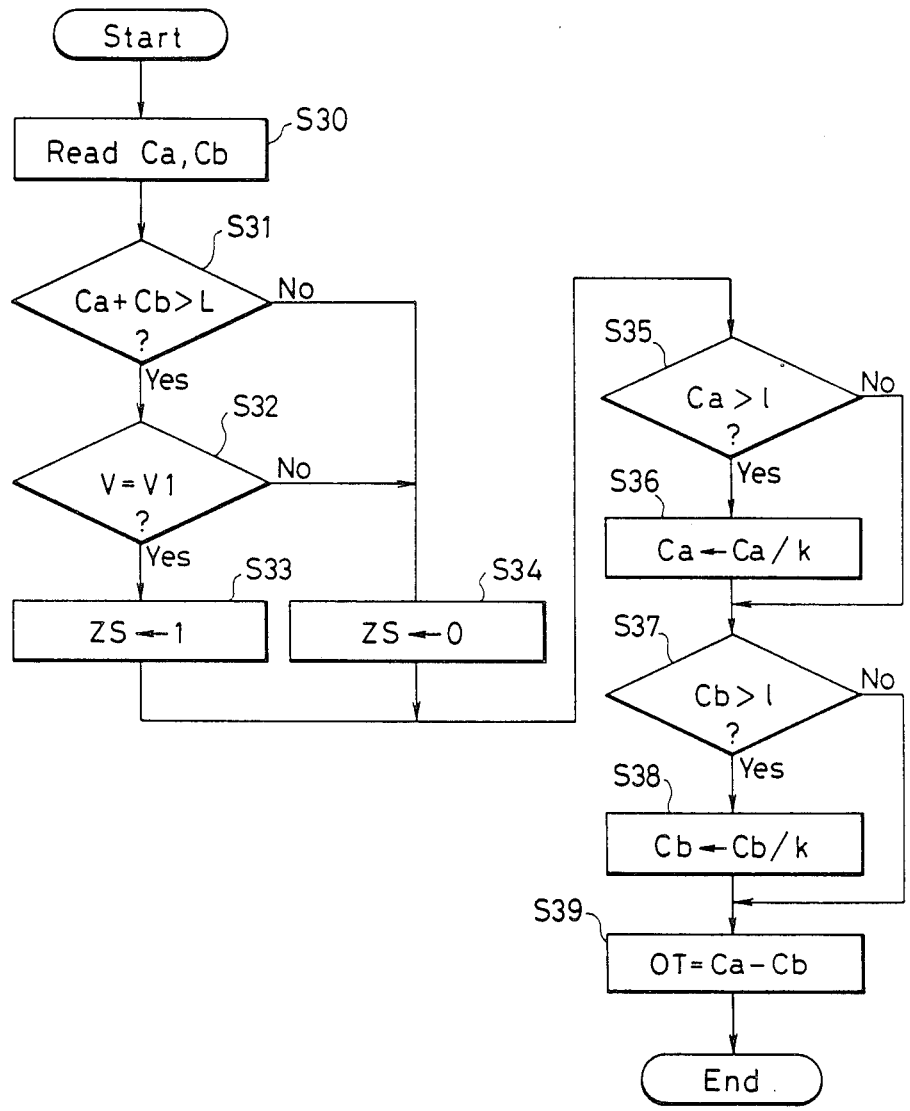
FIG. 5 is a flowchart showing an example of a control procedure for the discrimination means and head position control means.

Next, an example of a control procedure for the discriminator 30 will be explained, with reference to the flowchart shown in FIG. 5. The head position control circuit 20 has the function of moving each of the heads 3A–3D to a desired track. Accordingly, under the control of the control circuit 20, the head is moved to a certain track, of which it is still unknown whether this track is a reference track or an ordinary track. At that track position, the servo information of the track is read out by the head, and in response to the read out signal RS thus obtained, the off-track detection circuit 10 is operated so that the two counters 15a and 15b count the count values Ca and Cb and store the count values Ca and Cb in the two counters 15a and 15b. The discriminator 30 can detect the completion of the operation of the off-track detection circuit 10 by the disappearance of the above-mentioned mask signal MS, and the flow of the operations shown in FIG. 5 is started in synchronism with the disappearance of the mask signal MS.

In first step S30, the count values Ca and Cb are read out from the off-track detection circuit 10 and supplied to the discriminator 30. In next step S31, it is judged whether the sum of both the count values Ca and Cb is larger than a predetermined threshold L or not. This is for the purpose of judging whether the write-in frequency for the servo information read out is a high write-in frequency corresponding to a reference track or not. Since the sum of both the count values Ca and Cb is always substantially constant, regardless of an off-track amount of the head, this sum Ca+Cb is advantageously utilized for this judgement.

As will be readily understood from FIG. 4E, for example, even if the wave heights corresponding to the two servo information in the read out signal RS are different from each other, the numbers of count pulses in the respective groups CPa and CPb from the comparator 12 have such a relationship that if the number in one of the two groups increases, the number in the other group will decrease in proportion to an amount of that increase, and accordingly the sum of the numbers in both the count pulses in both the groups, that is, the sum of both count values Ca and Cb is always substantially constant irrespective of the off-track amount. Consequently, the above-mentioned threshold L can be set to a value slightly smaller than this constant sum. Here, if the sum of both the count values Ca and Cb is less than this threshold value L, then it means that at least one write-in frequency for the two kinds of servo information thus read out is lower, and consequently that the present track cannot be a reference track. In this case, the flow jumps from step S31 to step S34, in which the reference track signal ZS is set at logical value "0" representing an ordinary track.

In this embodiment, however, the servo information is written at the high write-in frequency not only for the reference track T0 but also for the adjacent track T1, as shown in FIG. 2. Thus, even if the judgement in step S31 is affirmative, it does not necessarily mean that the present track is a reference track. With this in view in subsequent step S32, it is judged whether the present vector V of the stepping motor 6 is positioned at a vector position corresponding to the reference track, for example, at the vector position V1 shown in FIG. 2.

FIG. 6 shows such vectors, for example, eight vectors V0–V7 to be formed by two phase currents IA and IB in phases A and B of the stepping motor 6. Of these vectors, four even-numbered vectors V0, V2, V4 and V6 shown by solid lines represent write-in positions for the servo information as shown in FIG. 2, and four odd-numbered vectors V1, V3, V5 and V7 correspond to the position of the track center lines. Here, it is assumed that vector V1 corresponds to the reference track T0. The vector position V is always refreshed and stored in the head position control circuit 20 so as to supply a correct drive signal DS to the drive circuit 7. In step S32, it is judged whether this present vector position V stored is equal to vector V1 corresponding to the reference track or not. If the judgement is negative, the present track is not the reference track, so the flow proceeds to step S34. On the other hand, if the judgement is affirmative, then the flow proceeds to step S33. In step S33, the reference track signal ZS is set at logical value "1" identifying the reference track, and the reference track signal ZS is derived from the discriminator 30.

After the substantial control procedure for the discriminator 30 is completed in this manner, the control procedure enters the procedure for the head position control circuit 20. In the first step, i.e., step S35, the relationship of values between the count value Ca and a partial threshold l is judged. This is for the purpose of judging whether the write-in frequency for the servo information generating the count value Ca is high or not. Here, the partial threshold l is predetermined to a value between the minimum count value for the servo information written at the high write-in frequency and the maximum count value for the servo information written at the low write-in frequency. As a result, the judgment can be performed. Theoretically, however, such setting should become impossible when the off-track amount of the head is a very large value. But, actually, the off-track amount is always a small value, so that the above-mentioned setting is practically possible and is sufficient. When the count value Ca is greater than such a partial threshold l, it means that the write-in frequency for the servo information is high. Hence, only in this case, the count value Ca is corrected in subsequent step S36 by dividing the count value Ca by the above-mentioned constant k (=write-in frequency/servo information frequency), for example, K=2. Steps S37 and S38 show procedures for similar correction of the other count value Cb. After the completion of the necessary correction of both the count values Ca and Cb as mentioned above, an off-track amount signal value OT is computed in step S39 by obtaining the difference Ca–Cb between the count values Ca and Cb. This signal value OT of the off-track amount may be used as a basis for correcting the head position by the head position control circuit 20. Based on this signal value OT, the head position control circuit 20 produces the drive signal DS, which is supplied to the drive circuit 7 to correct the head to a correct position on the track.

The present invention is not limited to the embodiments described above, and the system of the present invention may be embodied in various forms. It is not necessary that the servo information with respect to the reference track to be written at the write-in frequency different from that for the ordinary track is written into plural areas over a plurality of tracks like in the embodiments. The servo information can be written only into the servo information write-in areas for the reference track. Alternatively, the servo information can be written into only one area. The number of reference tracks need not be one. For example, two tracks, the such as outermost and innermost tracks, can be used as the reference tracks. Furthermore, the servo information may be arranged in such a way that a repetition of simple pulses is arranged only in a part of the servo information. In this case, the content of the servo information may be functionally divided into two portions, i.e., a portion for the reference track detection and a portion for the off-track amount detection. The operation and/or criteria of judgement of the discriminator 30 illustrated in FIG. 5 need not be limited to those given in the embodiments. They may, of course, be appropriately modified and implemented according to purposes or service conditions of the disc storage unit within the scope of the present invention.

In the above-mentioned embodiments, the servo information pattern is in the form of frequency modulation, but the servo information in other forms, including the form of PCM based on a special pattern or the form of pulse width modulation, may be employed. In short, it is sufficient that at least as a part of the servo information associated with a reference track, information for discriminating the reference track should be arranged in a form different from that of the servo information for the remaining ordinary tracks.

According to the present invention, as described above, by merely writing a simple pattern of the servo information for the reference track at a write-in frequency different from that for the ordinary track, the reference track can be detected from the read-out signal of the servo information read out by the head. This makes it possible to detect the reference track very simply without a special sensor and a circuit attached thereto which are conventionally used.

To embody the system of the present invention, therefore, a conventional disc storage unit may be used without any change in hardware. As to software, it is sufficient that a program having only a few steps is added to a conventional software. Consequently, the additional software burden is negligibly light, so that the execution time of the disc storage unit according to the present invention is substantially the same as that of the conventional disc storage unit.

Thus, the present invention contributes to lower the cost of a disc storage unit and also to simplify the manufacturing process of the disc storage unit, so that the present invention is suitably used in the mass production of disc storage units.

What is claimed is:

1. A system for detecting a reference track on a disc surface in a disc storage unit wherein the disc surface has a plurality of tracks and servo information for indicating an off-track amount of a position of a read/write head relative to said tracks is written on said disc surface, comprising:

said servo information having first servo information for identifying said reference track of said tracks and second servo information associated with the remaining tracks other than said reference track;

means for reading out said servo information by said read/write head;

means for judging whether the servo information read out is said first servo information or said second servo information; and means for detecting said read/write head is on said reference track when said means for judging judged said first servo information;

wherein said servo information is written in such a way that said servo information interrupts a part of said track, and that the center of an area onto which said servo information is written is deviated by about one half the distance between said tracks relative to the center of said track, and each servo information is written onto said area in such a way that each successive area is alternately deviated in the longitudinal direction of said track between two adjacent tracks.

2. A system for detecting a reference track on a disc surface in a disc storage unit as claimed in claim 1, wherein each of said first servo information and said second servo information consists of a repeated pattern of different frequencies.

3. A system for detecting a reference track on a disc surface in a disc storage unit as claimed in claim 2, wherein the frequency for said first servo information is k times (k>1) higher than that for said second servo information.

4. A system for detecting a reference track on a disc surface in a disc storage unit as claimed in claim 2, wherein said means for judging discriminates the frequency for said first servo information from the frequency for said second servo information.

5. A system for detecting a reference track on a disc surface in a disc storage unit as claimed in claim 1, wherein said first servo information for said reference track is arranged on at least one side of said reference track.

6. A system for detecting a reference track on a disc surface in a disc storage unit as claimed in claim 1, wherein said reference track is the outermost track of said disc.

7. A system for detecting a reference track on a disc surface in a disc storage unit as claimed in claim 1, wherein said reference track includes the outermost and innermost tracks of said disc.

8. A system for detecting a reference track on a disc surface in a disc storage unit as claimed in claim 1, wherein said first servo information and said second servo information are written onto separate portions of a common area associated with said reference track.

9. A method for detecting a reference track on a disc surface of a disc having a plurality of tracks on said disc surface wherein servo information for indicating an off-track amount of a position of a read/write head relative to said tracks is written on said disc, comprising the steps of:

writing said servo information on said reference track of said tracks in such a way that said servo information functions as said servo information with respect to the remaining tracks and as discriminating information for discriminating said reference track;

reading out said servo information by said read/write head; and judging said discriminating information from said servo information read out;

wherein said servo information is written in such a way that said servo information interrupts a part of said track, and that the center of an area onto which said servo information is written is deviated by about one half the distance between said tracks relative to the center of said track, and each servo information is written onto said area in such a way that each successive area is alternately deviated in the longitudinal direction of said track between two adjacent tracks.

10. A method for detecting a reference track on a disc surface of a disc having a plurality of tracks on said disc surface as claimed in claim 9, wherein each of said first servo information and said second servo information consists of a repeated pattern of different frequencies.

11. A method for detecting a reference track on a disc surface of a disc having a plurality of tracks on said disc surface as claimed in claim 9, wherein the frequency for said first servo information is k times (k>1) higher than that for said second servo information.

12. A method for detecting a reference track on a disc surface of a disc having a plurality of tracks on said disc surface as claimed in claim 9, wherein said first servo information for said reference track is arranged on at least one side of said reference track.

13. A method for detecting a reference track on a disc surface of a disc having a plurality of tracks on said disc surface as claimed in claim 9, wherein said reference track is the outermost track of said disc.

14. A method for detecting a reference track on a disc surface of a disc having a plurality of tracks on said disc surface as claimed in claim 9, wherein said reference track includes the outermost and innermost tracks of said disc.

15. A method for detecting a reference track on a disc surface of a disc having a plurality of tracks on said disc surface as claimed in claim 9, wherein said first servo information is arranged separately in a part of said second servo information.

* * * * *